Jan. 23, 1968    B. R. CUNDILL    3,365,366
COOLANT CIRCULATION SYSTEM FOR A NUCLEAR REACTOR
Filed Feb. 15, 1966    5 Sheets-Sheet 4
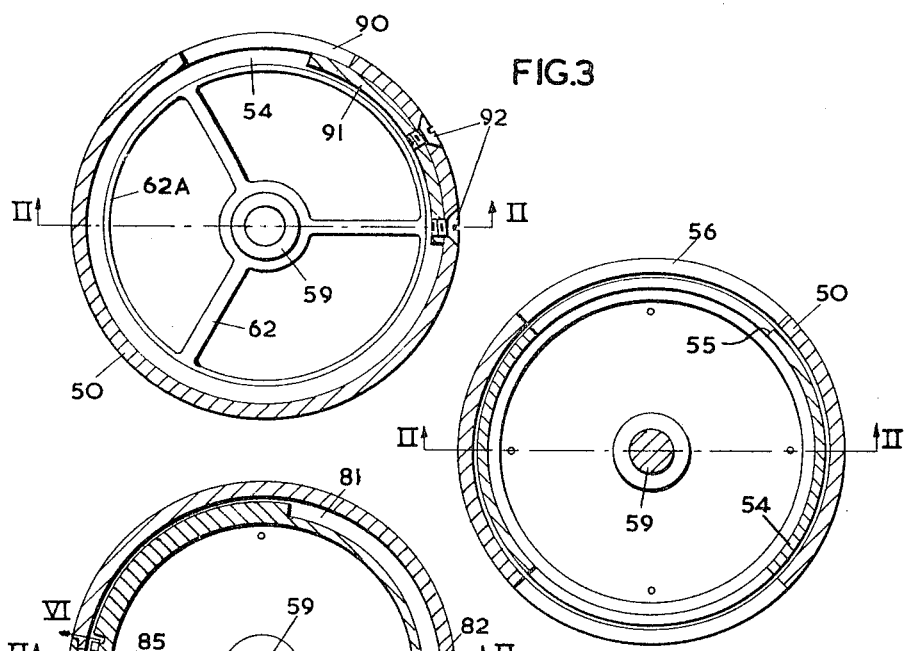
FIG.3
FIG.4
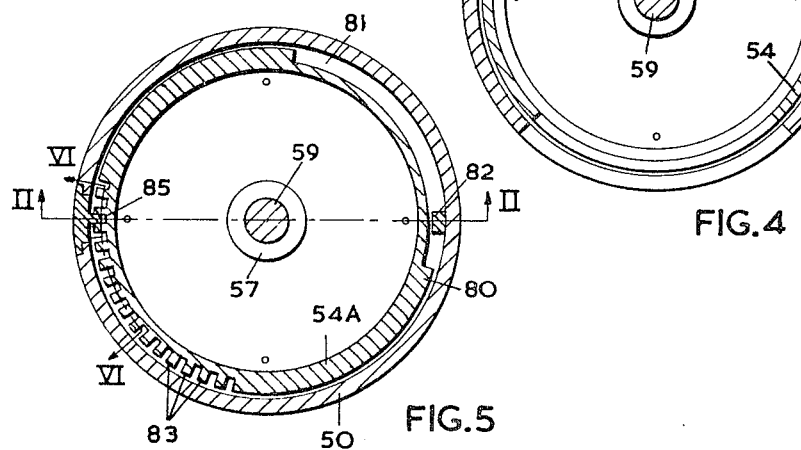
FIG.5
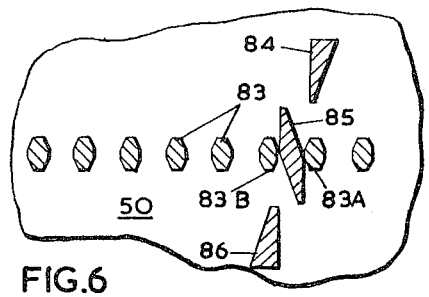
FIG.6

# United States Patent Office 3,365,366
Patented Jan. 23, 1968

3,365,366
COOLANT CIRCULATION SYSTEM FOR A NUCLEAR REACTOR
Brian Randall Cundill, Whetstone, England, assignor to The English Electric Company Limited, London, England, a British company
Filed Feb. 15, 1966, Ser. No. 527,426
Claims priority, application Great Britain, Feb. 16, 1965, 6,620/65
7 Claims. (Cl. 176—20)

ABSTRACT OF THE DISCLOSURE

A nuclear reactor coolant circulation system includes a variable gag valve in the inlet end of each fuel channel. Each gag valve comprises a valve member indexed round in a housing, by a remotely-operated fluid-pressure controlled actuating mechanism, between a fully-open position and a number of partly-closed positions. Flow control is obtained by co-operating ports in the valve member and housing. The gag valves may be controlled separately or in groups, the actuating mechanisms being responsive to the pressure differential between the operating fluid (supplied from an external source) and reactor coolant fluid.

---

This invention relates to a coolant circulation system for a nuclear reactor having a fuel-bearing reactor core, a plurality of fuel channels through said core for passage of reactor coolant fluid therethrough, a coolant inlet space communicating with inlet ends of said fuel channels, circulating means for circulating said coolant fluid successively through said inlet space and fuel channels, and gag valves disposed between said inlet space and at least some of said fuel channels for restricting the flow of coolant fluid through the corresponding fuel channels.

According to the invention, in such a system each of a plurality of said gag valves is provided with flow control means for varying said coolant flow through the gag valve, valve-operating means being provided, operatively connected to said flow control means for operation thereof, said valve-operating means being controllable from a location remote from the gag valves so that said coolant flow can be varied while the reactor is in operation.

According to a preferred feature of the invention, said valve-operating means comprises a plurality of actuating means incorporated in said gag valves, responsive to externally-applied variations in pressure of an operating fluid and operatively connected to each said flow control means, and pressure-control means for applying said operating fluid under pressure to the actuating means.

According to another preferred feature of the invention, each said actuating means is arranged to be in communication with said coolant fluid so as to be responsive to differences in pressure between said coolant fluid and said operating fluid.

According to a further preferred feature of the invention, each of said plurality of gag valves comprises a hollow housing and a hollow valve member arranged one inside the other, the valve member being movable rotatably with respect to the housing, and inlet and outlet means for allowing coolant fluid to enter and leave the valve, said flow control means including co-operating main flow ports formed in said housing and in said valve member so that on rotation of said valve member a common opening through said main flow ports may be varied.

According to a still further preferred feature of the invention, each valve member is also movable axially with respect to the corresponding housing, the corresponding said actuating means including axial-displacement means operatively connected to the valve member and responsive to said externally-applied variations in operating fluid pressure so as to move the valve member axially and indexing means arranged to rotate said valve member by a predetermined amount in response to axial movement of the valve member.

According to yet another preferred feature of the invention, said pressure-control means includes a first operating-fluid inlet means connected with the actuating means of each of said plurality of gag valves, two-way valve means connected with said first operating-fluid inlet means, second and third operating-fluid inlet means connected to alternative inlets of said two-way valve means, and first and second sources connected respectively to said second and third operating-fluid inlet means for supplying said operating fluid respectively at a first pressure greater than, and a second pressure less than, that of said coolant fluid in said inlet space of the reactor, whereby on operation of the two-way valve means to connect one of said alternative inlets with said first operating-fluid means, fluid pressure from the corresponding said source is applied to the actuating means.

According to still another preferred feature of the invention, said first operating-fluid inlet means comprises a first duct means connected to the actuating means of each of said plurality of gag valves, selector valve means connected to each group of said first duct means, and second duct means connected between said two-way valve means and said selector valve means, whereby operation of the selector valve means brings the two-way valve means into communication selectively with the various first duct means.

According to yet a further preferred feature of the invention, where the reactor includes temperature-responsive devices in at least some of the fuel channels thereof and temperature-indicating equipment responsive to electric signals from the temperature-responsive devices, the or each selector valve is provided with electric switch means arranged to connect with the temperature-indicating equipment any said temperature-responsive device in a fuel channel associated with the selector valve when the selector valve is operated to cause the gag valve in that fuel channel to be actuated.

Preferably, said operating-fluid is the same as the reactor coolant fluid.

A gag valve and valve-operating means, for incorporation in a coolant circulation system according to the invention, are included in the scope of the invention.

One coolant circulation system in a preferred form according to the invention, for controlling the flow of coolant gas in a gas-cooled nuclear reactor, will now be described by way of example and with reference to the accompanying drawings, of which:

FIG. 1 is a diagram showing in a very simplified form how the principal components of the system are interconnected;

FIG. 2, which for convenience is split into an upper and a lower half designated FIGS. 2A and 2B respectively, is a vertical sectional elevation, taken on the line II—II in FIGS. 3 to 5, of a gag valve which is part of the system;

FIG. 3 is a sectional plan taken on the line III—III of FIG. 2;

FIG. 4 is a sectional plan taken on the line IV—IV of FIG. 2;

FIG. 5 is a sectional plan taken on the line V—V of FIG. 2; and

FIG. 6 is a sectional elevation taken on the line VI—VI of FIG. 5, and with reference to FIGS. 7 and 8 accompanying the present specification, of which:

Figure 1:
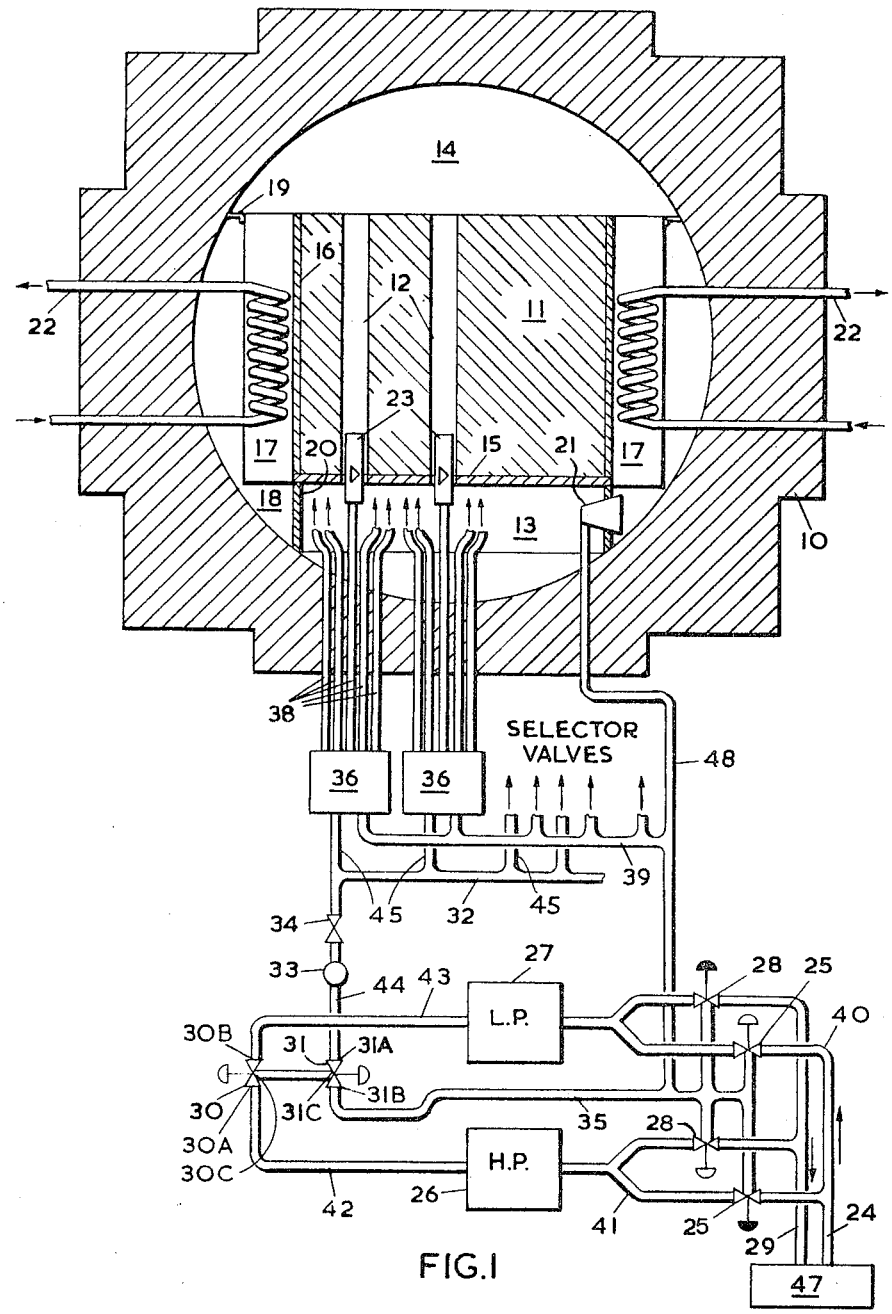
Figure 2A:
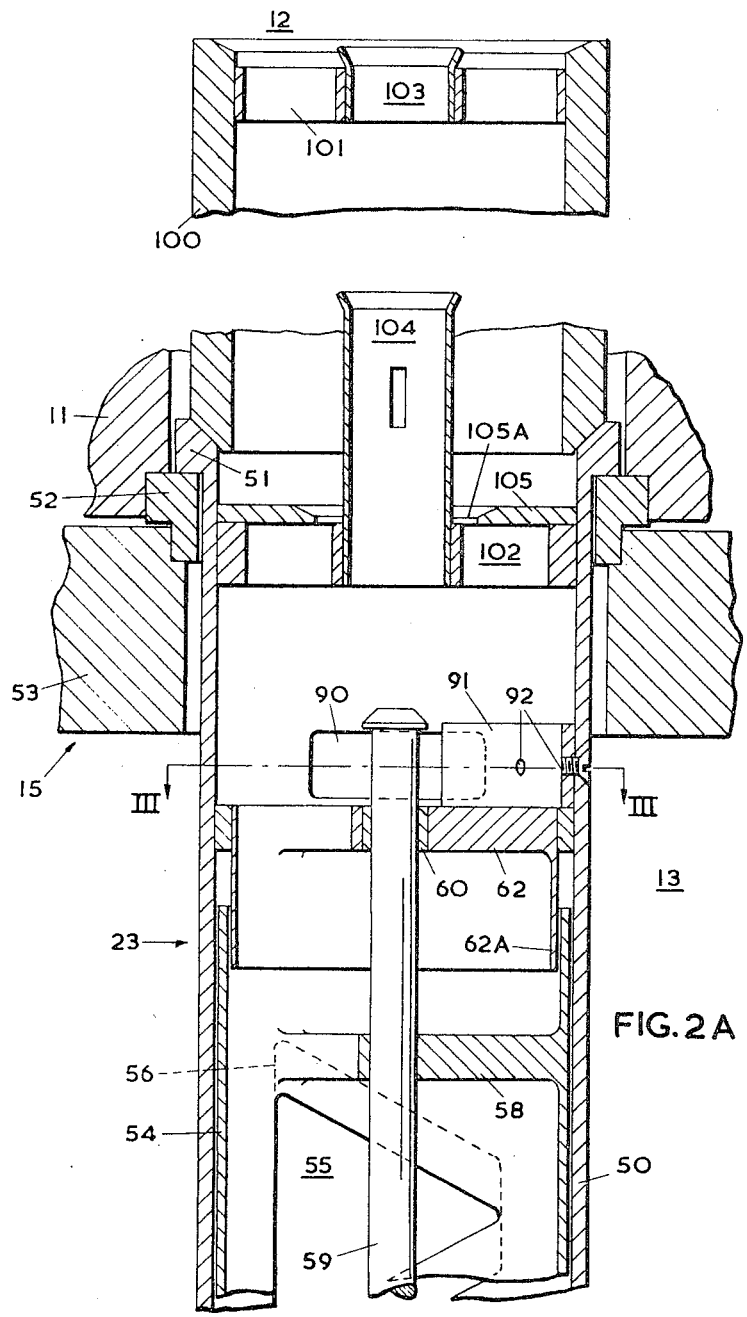
Figure 2B:
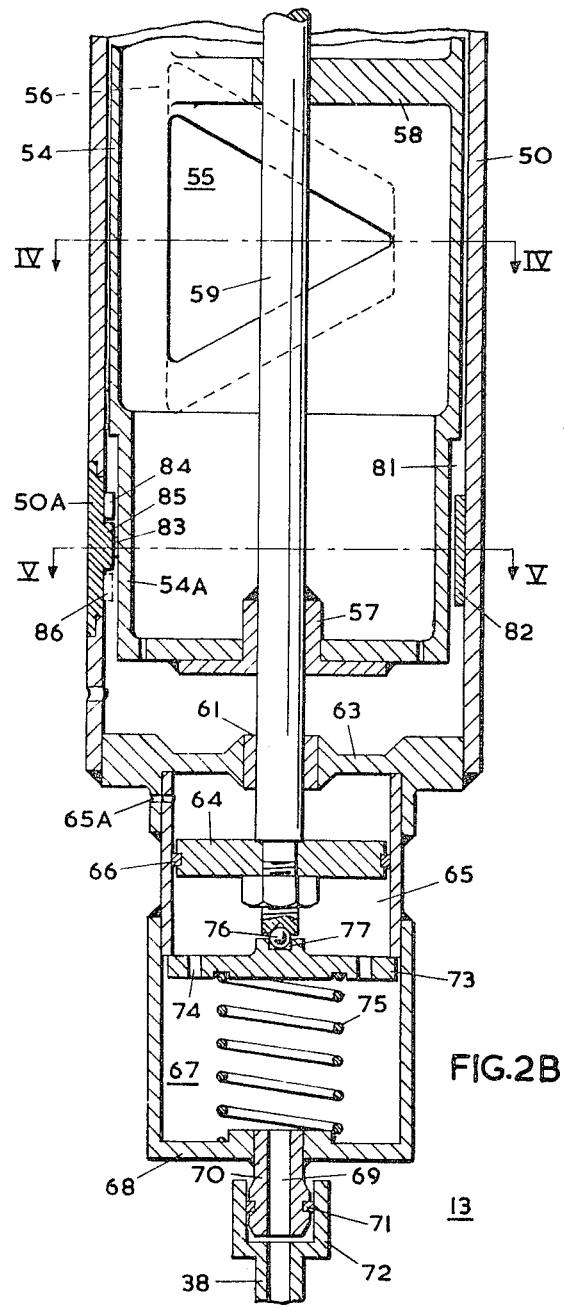

With reference firstly to FIG. 1, a gas-cooled nuclear reactor has a pressure vessel 10 containing a solid moderator core 11 having a large number of vertical fuel channels 12 which connect a bottom or inlet space with a top space 14 inside the pressure vessel. The core 11 rests on a support plate assembly 15 which is in turn supported (by means not shown) within the pressure vessel. Around the core 11 is a graphite reflector 16 surrounded by heat exchangers 17. The latter exhaust into an annular space 18 within the pressure vessel. Space 18 is separated from the top space 14 by annular sealing means 19, and from the inlet space 13 by an annular partition 20 which is penetrated by gas blowers 21 for blowing gas from the space 18 into the inlet space 13.

In operation, gas is circulated (as indicated by the arrows in FIG. 1) by the blowers 21 from the inlet space 13, up through the fuel channels 12 into the top space 14, thence down through the heat exchangers 17 into the annular space 18 and so back to the blowers 21. Heat imparted to the gas by nuclear fuel (not shown) in the fuel channels 12 is transferred in the heat exchangers 17 to a second fluid, such as water, which is removed in the form of steam through ducts 22 to drive a power turbine (not shown).

Secured in the inlet end of each fuel channel 12 there is a variable-flow gag valve 23, which will be described in detail presently. Each gag valve 23 is arranged so that most at least of the coolant gas entering the associated fuel channel 12 enters the gag valve from the inlet space 13 and passes up through the gag valve into the fuel channel. The degree of opening of each gag valve 23 is controlled by a separate operating fluid (referred to hereinafter, in this example, as "control gas") supplied from a separate high-pressure gas supply 47 at a pressure substantially higher than that in the inlet space 13.

The control gas is supplied from said supply 47 and used to operate the gas valves by means of valve-operating means which includes a control-gas circuit constituting pressure-control means and actuating means incorporated in each gag valve 23.

Control gas enters the gas-control circuit from the supply 47 through a supply pipe 24 which is connected, through two pipes 40, 41 having reducing valves 25 and arranged in parallel, to a high-pressure gas reservoir 26 and a low-pressure gas reservoir 27 respectively.

The reservoirs 26 and 27 are each connected through an unloading valve 28 to a gas effluent pipe 29. The reservoirs 26 and 27 are also connected through pipes 42, 43 respectively to two alternative inlets 30A, 30B respectively of a two-way primary solenoid valve 30 which exhausts through a main outlet 30C to the common inlet 31C of a two-way secondary solenoid valve 31. The valve 31 has two alternative outlets 31A, 31B connected respectievly to a selector valve inlet main 32 through a pipe 44 incorporating a flow switch 33 and throttle valve 34, and to a reference line 35 which is connected through a pipe 48 to the outlet of one or more of the blowers 21 or to some other suitable location communicating with space 13.

The selector valve inlet main 32 is connected through pipes 45 to the inlets of a number of separately-operated selector valves 36. Each selector valve 36 has a number of positions in each of which the inlet main 32 is in communication through the valve 36 with one or other of a number of actuator inlet pipes 38. Each actuator inlet pipe 38 is connected to a different gag valve 23; it can therefore be seen that the gag valves 23 are arranged in groups, each group being controlled through one selector valve 36. Each selector valve 36 has in addition a neutral position in which all the corresponding actuator inlet pipes 38 are in communication with a reference main 39, to which all the other selector valves 36 are similarly connected and which is itself connected to the reference line 35 and pipe 48.

It will be understood that FIG. 1 is very diagrammatic: for clarity only two of the many fuel channels 12 and their gag valves 23, only two selector valves 36, and only a few actuator inlet pipes 38, are shown.

The unloading valves 28 and reducing valves 25 are connected to the reference line 35 and are set to operate in such a way as to maintain the high-pressure and low-pressure reservoirs 26, 27 at a predetermined pressure differential respectively above and below that of the gas at the outlet of the blower 21, i.e. than the pressure of coolant gas in space 13. In a typical example, this predetermined pressure differential is 10 p.s.i.

With reference now to FIGS. 2 to 5, each gag valve 23 has a cylindrical outer housing or shell 50 supported through a top flange 51 and a gag support ring 52 on a core support plate 53 which forms part of the assembly 15 indicated in FIG. 1. The shell 50 is concentric with the corresponding fuel channel 12 and projects below it into the previously-mentioned lower space 13 is the pressure vessel.

Arranged co-axially within the shell 50 is a hollow cylindrical valve member 54, open at its upper end and having a triangular main flow port 55 formed in its side, co-operating with a trapezium-shaped main flow port 56 in the shell 50 to allow gas to pass from the space 13 to the inside of the valve member 54. The parallel sides of port 56 are axial, and port 55 is in the form of an isosceles triangle with its base axial and its height equal to the perpendicular distance between the parallel sides of port 56.

The valve member 54 is fixed by a bush 57 at the lower end of valve member 54, and by an integral spider 58 near its top end, to a central co-axial shaft 59, which is rotatable and movable axially in two graphite bearings 60, 61. The latter are carried respectively by a top bearing support spider 62 and a bottom bearing support plate 63, both of which are fixed in the shell 50. The top support spider 62 has a coaxial cylindrical debris guard 62A.

The lower end of shaft 59 carries a piston 64 which is slidable axially in an upper cylinder 65 fixed coaxially to, and below, the outside of the bottom bearing support plate 63.

A port 65A is provided in the wall of cylinder 65 at a piston which is always above piston 64, so that the top of piston 64 is always subjected to the gas pressure existing in inlet space 13.

The piston 64 carries an annular piston ring 66.

The lower end of the upper cylinder 65 is open and communicates with a lower cylinder 67, of larger internal diameter, which is arranged coaxially at this end of upper cylinder 65. The bottom end of the lower cylinder 67 is closed by an end plate 68, which is penetrated by an inlet duct 69 passing through a gas inlet nose 70. The nose 70 which is fixed to the end plate 68 and which extends axially therefrom, has an external ring seal 71 engaging an end fitting 72 on the end of the corresponding actuator inlet pipe 38, so as to provide a gas-tight connection between pipe 38 and nose 70.

A circular thrust plate 73, perforated by holes 74, is arranged within the lower cylinder 67 and is normally held by a compression spring 75 against the lower end of the upper cylinder 65. The lower end of shaft 59 bears, through a ball 76, on a central seating 77 formed in the upper side of the thrust plate 73.

The valve member 54 has a lower portion 54A, of smaller internal diameter than the remainder of the valve member. Lower portion 54A is provided with an integral external annular ring 80, as is best seen in FIG. 5. Part of ring 80 is cut away (as shown at 81 in FIG. 5) to accommodate an end stop 82 which is fixed to the bore of shell 50, while further portions of ring 80, diametrically opposite the cut-away portion 81, are cut away to form radial teeth 83 of hexagonal section as seen in radial elevation (see FIG. 6). Adjacent the teeth 83 and fixed in an insert 50A in the bore of shell 50, there are three axially-spaced tapered lugs 84, 85, 86.

The teeth 83 and lugs 84 to 86 are so shaped, with some of their sides inclined to the axial direction, that if the valve member 54 moves axially upwards from the central axial position shown in the drawings (referred to herein as the first axial position) to a second axial position in the cylinder 65, one of the two teeth 83 adjacent the central lug 85 (that is the tooth indicated at 83A in FIG. 6), when it reaches the upper lug 84, is moved by lug 84 to the right as seen in FIG. 6, so that the valve member 54 is rotated clockwise as seen in FIG. 5. If the valve member 54 now moves back to its first axial position, the next tooth (indicated at 83B in FIG. 6) passes downwardly between the lugs 84 and 85 and takes up the position (adjacent the central lug 85) previously occupied by tooth 83A.

If on the other hand the valve member 54 moves axially downwards from its first axial position to a third axial position, the tooth 83B is moved to the left (as seen in FIG. 6) by engagement with the lower lug 86, so that an anticlockwise movement is imparted to the valve member 54.

Thus it can be seen that the teeth 83 and lugs 84 to 86 constitute an indexing mechanism for rotating the valve member 54 by one tooth pitch at a time in response to axial movement of the valve member, the direction of rotation being dependent on the initial direction of axial movement of valve member 54.

Near the upper end of the shell 50 is an additional optional gagging port 90, provided with a shutter 91 (see FIGS. 2 and 3) which is fixed by screws 92 to the shell 50. The position of shutter 91 is variable so as to provide coarse adjustment of gas flow through the gag valve.

The length of the axially-extending sides of the trapezium-shaped port 56 in the shell 50 is such that, in any rotational position of the valve member 54, the common opening defined by ports 55 and 56 in co-operation remains the same irrespective of the axial position of the valve member.

The upper end of the shell 50 carries a co-axial cylindrical extension piece 100. In the extension piece 100 there are concentric upper and lower lifting attachment spiders 101 and 102 respectively, carrying co-axial tubular lifting attachments 103, 104 which are arranged to be gripped by a suitable device such as a grabhead (not shown) for lowering the gag valve into position or for removing it up through the fuel channel 12. An orifice plate 105 may be fitted, if required, to the lower lifting attachment spider 102. Orifice plate 105 has an orifice 105A which, with port 90 and shutter 91, serves to provide initial coarse adjustment of gas flow through the gag valve.

In operation, coolant gas flows from the inlet space 13 through the ports 55 and 56 of each gag valve 23, up inside the valve member 54 and out through the cylindrical extension piece 100 into the corresponding fuel channel 12. To vary the coolant gas flow in a particular fuel channel 12, the selector valve 36 controlling the gag valve 23 fitted in that channel is operated manually or through suitable remote operating means (not shown), so as to connect the selector valve inlet main 32 to the actuator inlet pipe 38 corresponding to the said gag valve 23.

FIGS. 1 to 6 show the gag valve in the position of maximum gas flow through the valve. To decrease gas flow through the gag valve, the primary solenoid valve 30 is now operated so as to connect the low-pressure reservoir 27 to the secondary solenoid valve 31, the throttle valve 34 being open. Solenoid valve 31 is now operated, under the control of a suitable automatic timing device (not shown), so as to connect solenoid valve 30 with the inlet main 32 and thus bring the low-pressure reservoir 27 into communication through valve 36, with the underside of piston 64 in a gag valve 23 already selected by operation of a valve 36 as described above.

A higher gas pressure now exists above piston 64 than below it, so that the piston 64 and thrust plate 73 are moved downwardly against spring 75, so moving the valve member 54 axially downwards to its third axial position. The tooth 83 and lugs 85 and 86 co-operate, as described above, to rotate the valve member 54 by one tooth pitch in the anticlockwise direction (as seen in FIG. 5), so that part of the port 55 is now obscured by shell 50. The opening through ports 55 and 56 is thus reduced, as also is the coolant gas flow through the gag valve.

The solenoid valves 30, 31 are arranged to close automatically after a time sufficient for the valve member 54 to move axially through its full travel in either direction. When the solenoid valves 30, 31 close, the differential pressure across the piston 64 is released, so that spring 75 returns the valve member to the central axial position shown in the drawings.

Further operations of the solenoid valves 30, 31 operate the gag valve to reduce the coolant gas flow still further.

If it is now required to increase the coolant gas flow through the fuel channel, the primary solenoid valve 30 is operated so as to connect the high-pressure reservoir 26 to the secondary solenoid valve 31, and on operation of the latter a higher gas pressure is created below the piston 64 than above it. The piston 64 and valve member 54 rise to the second axial position, the valve member is rotated clockwise (as seen in FIG. 5) by co-operation of the teeth 83 and lugs 84, 85, and the opening through ports 55 and 56 is correspondingly increased. On each closing operation of the solenoid valves, the valve member 54 falls by its own weight to the central axial position shown in the drawings, the valve member 54 thus constituting its own return means for returning it from its second to its first axial position.

Figure 7:
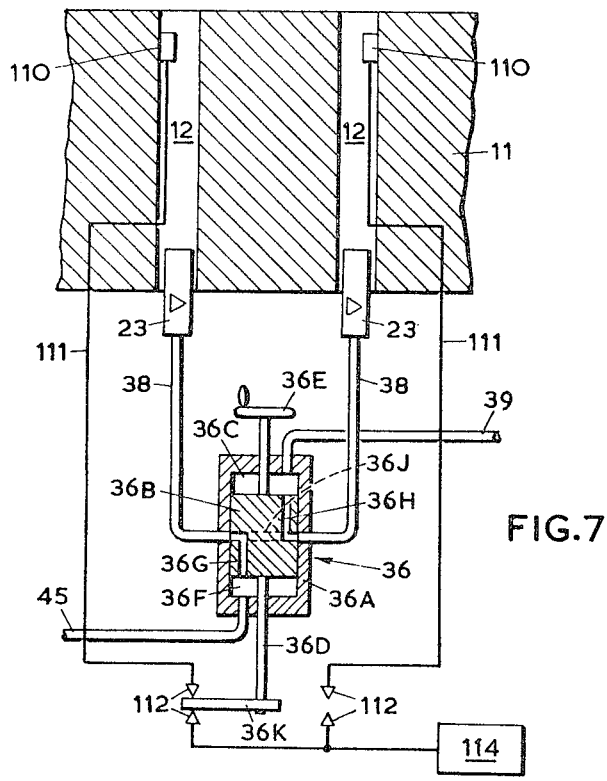
FIG. 7 is a simplified diagram illustrating the action of a selector valve incorporated in the system.

With reference now to FIG. 7, to illustrate the functions of the selector valves 36 one of these valves is shown diagramatically in FIG. 7. It will be understood that each valve 36 may be of any convenient type, but for convenience and clarity the one shown in FIG. 7 is represented by way of example as a rotary plug valve, having a plug 36B rotatable in a valve housing 36A by means of a shaft 36D carrying a handwheel 36E. The reference line 39 and inlet pipe 45 communicate with valve chambers 36C, 36F respectively, which are sealed from each other.

The valve 36 is shown, for clarity, as serving only two gag valves 23, though in practice there may be many more. The two actuator inlet pipes 38 corresponding to these gag valves communicate through passages 36G, 36H respectively in the plug 36B with the valve chambers 36F and 36C, when the valve is in the position shown in FIG. 7. In this position the left-hand and right-hand gag valves 23, as seen in FIG. 7, are thus brought into communication with pipe 45 and reference line 39 respectively. In a second position of the valve, the plug 36B is rotated so that passages 36G and and 36H now communicate with the right-hand and left-hand gag valves respectively, so enabling the right-hand gag valve to be actuated.

A third position of the valve 36 is the neutral position previously mentioned. In this neutral position, a passage 36J in the plug 36B brings the pipe 38 on the left-hand side of FIG. 7 into communication with the chamber 36C, the passage 36H being so designed that the other pipe 38 still communicates through it with chamber 36C.

It will be easily understood that such an arrangement can be modified to serve a larger number of gag valves, the selector valve having the said neutral position, in which all the gag valvee pistons 64 are in communication with reference line 39.

Shaft 36D carries an electrical contact arm 36K, which, when the valve 36 is in a position to bring a particular pipe 38 into communication with pipe 45, completes an electric circuit from a thermocouple 110 in the fuel channel corresponding to the said particular pipe 38, through a lead 111 and contacts 112, to a temperature-indicating device 114 situated away from the reactor. The effect on coolant gas temperature in any fuel channel of adjusting the gag valve in that channel can thus be observed on the device 114 as the adjustment takes place.

The switching device comprising arm 36K and contacts 112 is merely one example, shown very diagrammatically, of switching devices which may be used.

When not in use for selecting a gag valve for adjustment, each selector valve will normally be parked in its neutral position. Both sides of each piston 64 being then subjected to the pressure in the inlet space 13, no appreciable gas pressure can exist across the piston. Thus unwanted movements of the pistons due to any variations in gas pressures are avoided.

Figure 8:
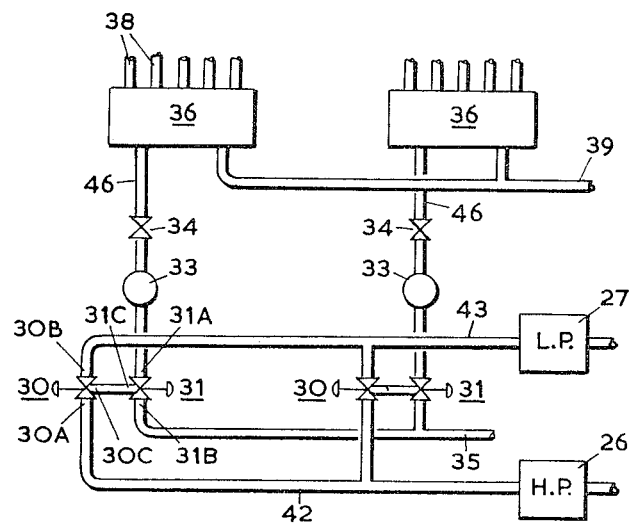
FIG. 8 is a diagram showing part of the system in an alternative form to that shown in FIG. 1.

With reference now to FIG. 8, in an alternative form of pressure-control means to that shown in FIG. 1, the pipes 42, 43 supply a number of pairs of solenoid valves 30, 31, the valves 30 being in parallel with each other between the pipes 42 and 43. Each valve 31 has one of its alternative outlets, 31B, connected to the reference line 35 as before, but each outlet 31A is connected, through a pipe 46 in which there are a flowswitch 33 and throttle valve 34, to a different single selector switch 36.

The number of teeth 83 (FIGS. 2, 5, 6), and therefore of steps in which it is possible to vary the coolant gas flow, can be any suitable figure. In the example described there are fifteen.

The shape of the ports 55 and 56 need not be as described above and shown in FIG. 2: they can for example be rectangular or of any other suitable shape as required. Some or all of the fuel channels in the reactor may be provided with gag valves according to the invention. If required, the gag valves may be arranged in two or more principal groups, each principal group comprising a number of the previously-mentioned groups of gag valves (each controlled by one selector valve 36), and the selector valves 36 in each principal group being connected to a selector valve inlet main 32 common to that principal group, while each inlet main 32 has its own pair of solenond valves 30, 31. Such an arrangement permits simultaneous operation of as many gag valves as there are principal groups. This is another alternative to that shown in FIG. 8.

The indexing mechanism is not limited to that described herein, but may be of any suitable kind: the valve member may be arranged for rotation in only one direction, in which case the lug 84 or the lug 86, but not both, will be provided. In this case there will only be two axial positions of the piston 64 and either the high-pressure reservoir 26 or the low-pressure reservoir 27 (FIG. 1) and their associated equipment may be omitted. In one example of another indexing mechanism, instead of the radial teeth 83 and fixed radial lugs 84 to 86 the design may be similar to that described in connection with a rotary selector valve in British Patent No. 1,006,070.

The gag valves may if desired be arranged differently from the arrangement shown in the drawings and in such a way that reactor coolant gas passes from the inlet space 13 into the interior of each valve through some suitable non-variable inlet, for example through large co-operating non-variable port openings in the shell 50 and valve member 54, or through openings in end plate 63 and in the bottom end of valve member 54. In this case the top end of valve member 54 or shell 50 (or both) will be closed, the gas leaving the valve by way of the ports 55 and 56 to the corresponding fuel channel 12.

The operating fluid supplied to the reservoirs 26, 27 is preferably the same fluid (for example carbon dioxide gas) as is used for the reactor coolant fluid, but it may if desired be of any other suitable fluid, for example a liquid such as oil or water. Suitable sealing means must then be provided to prevent mixing of the operating fluid and coolant fluid in the main 39 and in the gag valves. The coolant fluid may for example be a liquid.

In the arrangement described herein some of the reactor coolant gas by-passes the ports 55, 56 and passes through the gagging port 90 directly into the fuel channel 12. The gagging port 90 and shutter 91 may if desired be omitted. Alternatively or in addition, other by-pass means may be provided, such as passages (not shown) through the core support plate 53, support ring 52 and flange 51: this may be desirable in order to preserve a constant supply of coolant gas for such purposes as interstitial flow between graphite blocks such as may constitue the moderator core 11.

Provided there are suitable return means (such as springs) for returning the valve member 54 to its central (first) position after actuation by application of differential pressure across piston 64, valves according to the invention can be used in any position dictated by the requirements of the application.

In a nuclear reactor, such a valve can be arranged, if desired, at the top end of a fuel channel.

Preferably, suitable interlocking means are between the selector valves 36 to prevent the selection of more than one gag valve 23 for operation at any one time. There may also be a further interlock to delay movement of each selector valve after each gag valve operation, until sufficient time has elapsed for the temperature of the reactor coolant gas in the fuel channel corresponding to the gag valve being operated to have changed in response to the new gag valve setting.

Indication that a gag valve in the system has reached the "fully open" position may be obtained by pneumatic means (not shown). The slowswitch 33 is arranged to operate when the gag valve receives a pneumatic pulse in the "fully open" position due to increased flow caused by uncovering a port in the mechanism. Indication of the "fully closed" position can be provided by similar means.

The thermocouple leads 111 if provided, need not be led directly to the selector valve switching device 36K, 112. Instead, the selector valve contacts may for example be used to transmit signals to a control system for operating a separate thermocouple selector switch, so as to enable the temperature in any full channel selected for actuation of the corresponding gag valve to be monitored.

Other suitable temperature-responsive devices may be substituted for the thermocouples 110, and such devices, whether comprising thermocouples or not, may be in any convenient position.

The selector valves 36 may be operated remotely, by means of a pneumatic or electric control system.

I claim:
1. In a coolant circulation system for a nuclear reactor comprising a fuel-bearing reactor core having fuel channels through said core for flow of reactor coolant fluid therethrough, a coolant inlet space communicating with inlet ends of said channels, circulating means for circulating said coolant fluid successively through said inlet space and fuel channels, a plurality of gag valves in said inlet ends of the fuel channels for restricting coolant fluid flow therethrough, each comprising variable flow control means for varying said flow and an actuating means responsive to externally-applied variations in pressure of an operating fluid and operatively connected for controlling the corresponding said flow control means, and pressure control means for applying said operating fluid under pressure to the actuating means, the actuating means including means for bringing one side of said actuating means into permanent communication with said coolant fluid and means for bringing the other side thereof into communication with said pressure control means, whereby each said actuating means is responsive to pressure differences between said coolant and operating fluids; an arrangement wherein each said flow control means comprises a hollow housing and a hollow valve member arranged one inside the other, co-operating ports being formed in the housing and valve member for flow of said coolant fluid therethrough, and wherein each said actuating means comprises axial-displacement means comprising means operatively connected to the corresponding valve member for moving the valve member axially between a first axial position and a second axial position when there is a pressure difference between said coolant and operating fluids, first return means connected with the axial-displacement means for returning the valve member to said first axial position when the pressures of said fluids are equal, and indexing means connected with said housing and valve member for rotating the valve member by a predetermined amount in the housing when the valve member is moved from said first axial position through said second and back to said first axial position, whereby to vary a common opening through said ports.

2. A coolant circulation system according to claim 1, wherein each axial-displacement means comprises means for urging the valve member to said second axial position when the pressure of said operating fluid is greater than, and to a third axial position when the pressure of said operating fluid is less than, that of said coolant fluid, said first axial position being midway between said second and third axial positions, and said actuating means includes second return means connected with the corresponding axial-displacement means for returning the corresponding valve member from said third to said first axial position when the axial-displacement means ceases to urge the valve member towards said third position, the corresponding indexing means being arranged to rotate the valve member by said predetermined amount in one direction when the valve member is moved from said first axial position through said second and back to said first axial position and in the opposite direction when the valve member is moved from said first axial position through said third and back to said first axial position.

3. A coolant circulation system according to claim 1, wherein said pressure-control means includes a first operating-fluid inlet means connected with the axial-displacement means of each of said plurality of gag valves, two-way valve means connected with said first operating-fluid inlet means, second and third operating-fluid inlet means connected to alternative inlets of said two-way valve means, and first and second sources connected respectively to said second and third operating-fluid inlet means for supplying said operating fluid respectively at a first pressure greater than, and a second pressure less than, that of said coolant fluid in said inlet space of the reactor, whereby on operation of the two-way valve means to connect one of said alternative inlets with said first operating-fluid inlet means, fluid pressure from the corresponding said source is applied to the actuating means.

4. A coolant circulation system according to claim 3, wherein said first operating-fluid inlet means comprises a first duct means connected to the actuating means of each of said plurality of gag valves, selector valve means connected to each group of said first duct means, and second duct means connected between said two-way valve means and said selector valve means, whereby operation of the selector valve means brings the two-way valve means into communication selectively with the various first duct means.

5. A coolant circulation system according to claim 3, wherein said second source includes a low-pressure reservoir connected with said third operating-fluid inlet means, fourth duct means connected with said low pressure reservoir and with an external supply of operating fluid at at least said first pressure, and reducing valve means in said fourth duct means arranged to reduce the pressure therein to said second pressure, and said first source includes a high-pressure reservoir connected with said second operating-fluid inlet means and fifth duct means connected with said high-pressure reservoir and with said supply.

6. A coolant circulation system according to claim 4, wherein said selector valve means comprises a plurality of selector valves, and including sixth duct means connected between each selector valve and said inlet space of the reactor, each selector valve being arranged to bring the sixth duct means into communication with said first duct means except when the selector valve is operated to bring the second duct means into communication with the first duct means, whereby to prevent any substantial pressure difference occurring in the corresponding actuating means.

7. A coolant circulation system according to claim 4, for a nuclear reactor including temperature-responsive devices in some of the fuel channels thereof and temperature-indicating equipment responsive to electric signals from the temperature-responsive devices, wherein each selector valve is provided with electric switch means arranged to connect with the temperature-indicating equipment any said temperature-responsive device in a fuel channel associated with the selector valve when the selector valve is operated to cause the gag valve in that fuel channel to be actuated.

References Cited

UNITED STATES PATENTS

| | | | |
|---|---|---|---|
| 3,151,030 | 4/1964 | Taylor | 176—60 X |
| 3,240,675 | 3/1966 | Weber | 176—20 |

FOREIGN PATENTS

| | | |
|---|---|---|
| 858,504 | 1/1961 | Great Britain. |
| 922,221 | 3/1963 | Great Britain. |
| 1,006,070 | 9/1965 | Great Britain. |
| 1,012,615 | 9/1965 | Great Britain. |

REUBEN EPSTEIN, *Primary Examiner.*